W. H. SCHULTZE.
TROLLEY WHEEL.
APPLICATION FILED OCT. 31, 1911.

1,023,338. Patented Apr. 16, 1912.

WITNESSES:
May Montgomery
S P Wilson

INVENTOR
William H. Schultze.
BY
Hardway & Cathy
ATTORNEYS.

UNITED STATES PATENT OFFICE.

WILLIAM H. SCHULTZE, OF HOUSTON, TEXAS.

TROLLEY-WHEEL.

1,023,338.   Specification of Letters Patent.   Patented Apr. 16, 1912.

Application filed October 31, 1911. Serial No. 657,793.

*To all whom it may concern:*

Be it known that I, WILLIAM H. SCHULTZE, a citizen of the United States, residing at Houston, in the county of Harris and State of Texas, have invented certain new and useful Improvements in Trolley-Wheels, of which the following is a specification.

My invention relates to new and useful improvements in trolley wheels.

The object of the invention is to provide a device of the character described which includes the ordinary trolley wheel and a mechanism for preventing the same from becoming displaced from the trolley wire, said mechanism being so constructed and arranged that the wheel may be readily removed from, or replaced on the wire when so desired.

Figure 1:
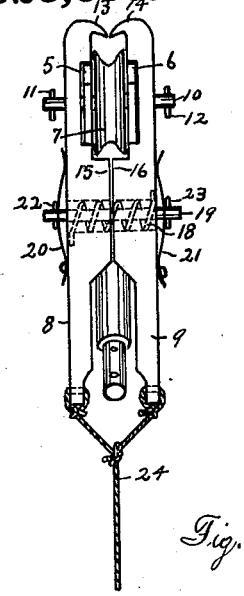
Figure 2:
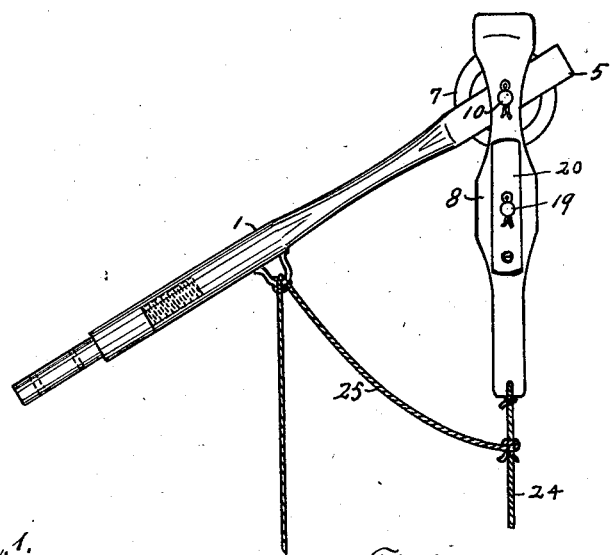
Figure 3:
Figure 4:
Figure 5:
Figure 6:
Figure 7:
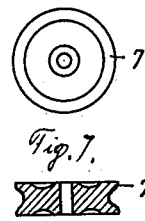
Figure 8:

With the above and other objects in view, the invention has particular relation to certain novel features of construction, operation and arrangement of parts, an example of which is given in this specification and illustrated in the accompanying drawings, wherein, Figure 1 is a rear view of the device. Fig. 2 is a side elevation thereof, showing also a section of the trolley pole. Fig. 3 is a plan view of the connecting section of the trolley pole. Fig. 4 is a plan view of the free end section of the trolley pole. Figs. 5 and 6 are plan and sectional views, respectively, of the jaws which embrace the trolley wheel and serve to secure the same upon the trolley wire, and Figs. 7 and 8 are side elevation and sectional views, respectively, of the trolley wheel.

Referring now more particularly to the drawings, wherein like numerals of reference designate similar parts in each of the figures, the numeral 1 refers to the free end section of the trolley pole, which is connected to the section of said pole, (not shown) carried by the car by means of the connection section 2. One end of the section 2 has a threaded neck 3, which is screwed into a corresponding internal threaded socket in the lower end of the section 1 and the other end of this connection section has a reduced neck 4 which is provided for the purpose of fitting into a corresponding socket in the upper end of the section carried by the car and which may be secured therein by means of suitable pins (not shown). The upper, or free end of the section 1 of the trolley pole is bifurcated having the fingers 5 and 6 which embrace the trolley wheel 7. On either side of the fingers 5 and 6 I have provided the jaws 8 and 9 which are secured to the trolley pole by means of the shaft 10 which passes through said jaws and also through the fingers 5 and 6 of the pole and through the hub of the trolley wheel 7. This shaft is secured in place by means of the pins 11 and 12 which are secured in the end thereof and some distance from the jaws so as to allow the jaws a limited lateral play on said shaft. The trolley wheel 7 has the usual peripheral groove for the trolley wire and the upper end of the jaws 8 and 9 are provided with the inwardly extending hooks 13 and 14 which overhang the wheel and embrace the wire and operate to hold the wire in said groove and prevent the wheel from disengaging from the wire. The fingers 5 and 6 of the trolley pole are countersunk into the respective jaws 8 and 9. These jaws depend from the shaft 10 and have inwardly extending shoulders 15 and 16 which rest against each other beneath the wheel 7 and serve as fulcrums for the jaws for a purpose which will presently be set forth. Extending transversely through both jaws, is an enlarged orifice 17 in which is a coil spring 18 whose respective ends are secured to the respective jaws 8 and 9. This spring surrounds the shaft 19 which extends through said orifice and secured upon the jaws 8 and 9 are the respective flat springs 20 and 21, through which also the shaft 19 extends. These springs are arcuate in shape and curve outwardly from their respective jaws and the shaft 19 is secured in place by means of the respective pins 23, which are secured in the ends thereof and rest against the springs 20 and 21, respectively, on the outside thereof. The jaws 8 and 9 extend some distance below the shoulders 15 and 16 and diverge outwardly therefrom and secured to the lower ends thereof is the cable 24. Secured to this cable at one end and to the section 1 of the trolley pole and at the other is the cable 25 which serves to limit the backward movement of the jaws 8 and 9.

When it is desired to remove the trolley wheel from the wire, a downward pull is exerted on the cable 24, whose upper end is divided and secured to each of the jaws 8 and 9. This downward pull operates to draw the lower ends of the jaws together and overcoming the resistance of the springs 18, 20 and 21 operates to force the hooks 13 and 14 apart by reason of the contacting shoulders or fulcrums 15 and 16 and permits the trolley wire to pass between the hooks 13 and 14. When the cable 24 is released the said springs operate to cause the jaws to assume their normal position, as shown in Fig. 1. The upper sides of the hooks 13 and 14 are inwardly beveled and when it is desired to replace the trolley wheel on the wire, cable 24 is again given a downward pull and the wheel 7 alined directly beneath the wire which passes between the hooks 13 and 14 and assumes its position in the groove of the trolley wheel, the downward bevel of the hooks 13 and 14 rendering this operation the more easily performed. The under sides of the hooks 13 and 14 are abruptly shouldered so that the hooks are not very easily forced apart by an upward movement of the trolley wire.

A device of this character constructed as described in this specification and shown in the drawings accompanying the same and made a part thereof, will be of simple and easy construction and will effectively prevent the displacement of the trolley wheel from the wire.

What I claim is:—

1. A device of the character described, including a trolley pole, whose free end is bifurcated, a trolley wheel secured between the fingers thereof, a plurality of jaws embracing said pole and wheel, an inwardly extending hook carried by each jaw, said hooks overhanging said trolley wheel, an inwardly extending fulcrum carried by each jaw beneath the trolley wheel, said fulcrums contacting with each other and means secured to the lower ends of the jaws for depressing said lower ends and causing the jaws to operate on said fulcrum to spread the upper ends thereof.

2. A device of the character described, including a trolley pole composed of detachable sections, a trolley wheel carried by the free end of said pole, a plurality of jaws embracing the free end of said pole and said wheel, an inwardly extending hook having its underside abruptly shouldered, carried by the upper end of each jaw, said hooks overhanging the trolley wheel, an inwardly extending shoulder carried by each jaw beneath the trolley wheel, said shoulders contacting with each other, a transverse shaft extending laterally through said jaws beneath the trolley wheel and securing the jaws together, a resilient member secured to each end of said shaft and resting against each respective jaw, a means secured to the lower end of the jaws for forcing said ends toward each other and overcoming the resistance of said resilient members whereby the upper ends of said jaws are forced apart.

3. A device of the character described, including a trolley pole whose free end is bifurcated, a trolley wheel having a peripheral groove secured between the fingers of said bifurcated ends, two opposing jaws embracing said trolley pole and wheel and depending therefrom, a shaft extending through the said jaws, fingers and wheel and securing the same together, an inwardly extending shoulder carried by each of said jaws beneath said wheel, said shoulders resting against each other, a shaft extending through an enlarged opening in said jaws beneath said wheel, a coil spring within said opening and surrounding said shaft whose opposite ends are secured, respectively, to the respective jaws, a resilient member carried by each end of the last mentioned shaft and pressing against the respective jaws and a means secured to the lower end of the jaws and depressing the same and causing the same to operate upon the said shoulders as fulcrums and overcome the resistance of said resilient members and spread the upper ends of said jaws.

In testimony whereof I have signed my name to this specification in the presence of two subscribing witnesses.

WILLIAM H. SCHULTZE.

Witnesses:
E. FRUEHBECK,
MAY MONTGOMERY.

---

Copies of this patent may be obtained for five cents each, by addressing the "Commissioner of Patents, Washington, D. C."